United States Patent [19]

Lutz

[11] Patent Number: 4,853,808

[45] Date of Patent: Aug. 1, 1989

[54] LINEAR ACTUATOR FOR DISC DRIVE

[75] Inventor: Frank T. Lutz, Cardiff, Calif.

[73] Assignee: Cardiff Technology Inc., Cardiff, Calif.

[21] Appl. No.: 115,124

[22] Filed: Oct. 30, 1987

[51] Int. Cl.⁴ .......................... G11B 5/55; G11B 21/08
[52] U.S. Cl. ................................. 360/98.01; 360/106; 310/13
[58] Field of Search .......................... 360/106, 97–99; 310/12–13

[56] References Cited

U.S. PATENT DOCUMENTS

| | | | |
|---|---|---|---|
| 4,415,941 | 11/1983 | Gibeau et al. | 360/98 X |
| 4,427,905 | 1/1984 | Sutton | 360/106 |
| 4,462,054 | 7/1984 | Dong et al. | 360/106 |
| 4,553,183 | 11/1985 | Brown et al. | 360/98 |
| 4,743,987 | 5/1988 | Farmer et al. | 360/98 X |

Primary Examiner—John H. Wolff
Attorney, Agent, or Firm—Flehr, Hohbach, Test, Albritton & Herbert

[57] ABSTRACT

A disk drive includes a linear actuator in which a single coil is mounted to the side of a carriage assembly and in association with a magnetic structure linearly moves the carriage assembly along upper and lower rails in positioning pickup heads on the surfaces of spinning disks. The carriage assembly includes a cantilevered roller support arm that is biased into engagement with the rails by a spring. The pick up heads are mounted on flexible arms attached to the carriage assembly, and the arms include cam members engage a non-magnetic stationary rod extending from the magnetic structure when the carriage assembly is moved to an extreme to travel thereby flexing the arms and lifting the heads from the surfaces of the disks.

15 Claims, 3 Drawing Sheets

LINEAR ACTUATOR FOR DISC DRIVE

BACKGROUND OF THE INVENTION

This invention relates to a linear motor driven actuator (linear actuator) used to position the read/write transducers of a disk drive, and more particularly the invention relates to a disk drive incorporating one or more 3.5-inch-diameter or 5.25-inch-diameter magnetically coated disks.

In the past, more compact disk drives have been made possible by utilizing an actuator wherein the linear motor consisted of dual magnetic structures and a single coil. Such linear actuators have been manufactured and shown by Cipher Data Products of San Diego, California and have been manufactured and sold by Sequential Information Systems of Elmsford, New York and also by Western Dynex of Phoenix, Arizona. Other manufacturers have since manufactured linear actuators incorporating dual magnetic structures and either a single coil or dual coils. These linear actuators, especially when configured for use in 5-¼-inch and smaller disk drives, have suffered from several problems. They are comparatively complex and therefore difficult and expensive to manufacture. In addition, considerable electrical power is required to move and control the high-inertia load presented by the actuator's relatively heavy carriage-coil assembly.

There is therefore a need for a new and improved linear actuator that (a) has performance equivalent to or better than currently available products, (b) is simpler and less expensive to manufacture, (c) can be incorporated into disk drives having the industry-standard form factor, and (d) accomplishes these objectives while substantially reducing electrical power consumption.

SUMMARY OF THE INVENTION

In general, it is an object of the present invention to provide a linear actuator that has a low moving mass.

Another object of the invention is to provide a linear actuator of the above character in which the carriage and coil structures have been designed to provide maximum stiffness with minimum weight.

Another object of the invention is to provide a linear actuator of the above character in which a unitary frame structure is utilized.

Another object of the invention is to provide a linear actuator of the above character in which the bearing mounting surfaces provided on the frame are simultaneously machined.

Another object of the invention is to provide a linear actuator of the above character in which a canti-levered arm is provided which is capable of flexing.

Another object of the invention is to provide a linear actuator of the above character in which the unitary frame is stiff in a lateral direction but in which the cantilevered arm can flex in a vertical direction.

Another object of the invention is to provide a linear actuator in which an even distribution of forces is provided on the bearing surfaces.

Another object of the invention is to provide a linear actuator of the above character which has a voice coil which is mounted on the vertical center of mass but drives the carriage from only one side.

Another object of the invention is to provide a linear actuator of the above character in which the low mass of the carriage minimizes the effect of the unbalanced force on the carriage provided by the voice coil.

Another object of the invention is to provide a linear actuator of the above character which utilizes an offset voice coil.

Another object of the invention is to provide a linear actuator of the above character in which forces are provided to counteract the unbalanced force provided by the offset voice coil.

Another object of the invention is to provide a linear actuator of the above character in which the force provided by the offset voice coil can be readily accommodated by the linear actuator.

The invention and objects and features thereof will be more readily apparent from the following description and appended claims when taken with the drawing.

DETAILED DESCRIPTION OF ILLUSTRATIVE EMBODIMENT

In general, the linear actuator consists of first and second spaced-apart plates. A magnetic structure is mounted between the plates and has a pole piece extending longitudinally of the plates. First and second guide rods are carried by the plates and extend in a direction which is parallel to the pole piece. A carriage is provided. Rollers are carried by the carriage and engage the guide rods so that the carriage can reciprocate longitudinally on the rods. A coil is mounted on one side of the carriage and is coupled to the central pole piece.

Figure 1:
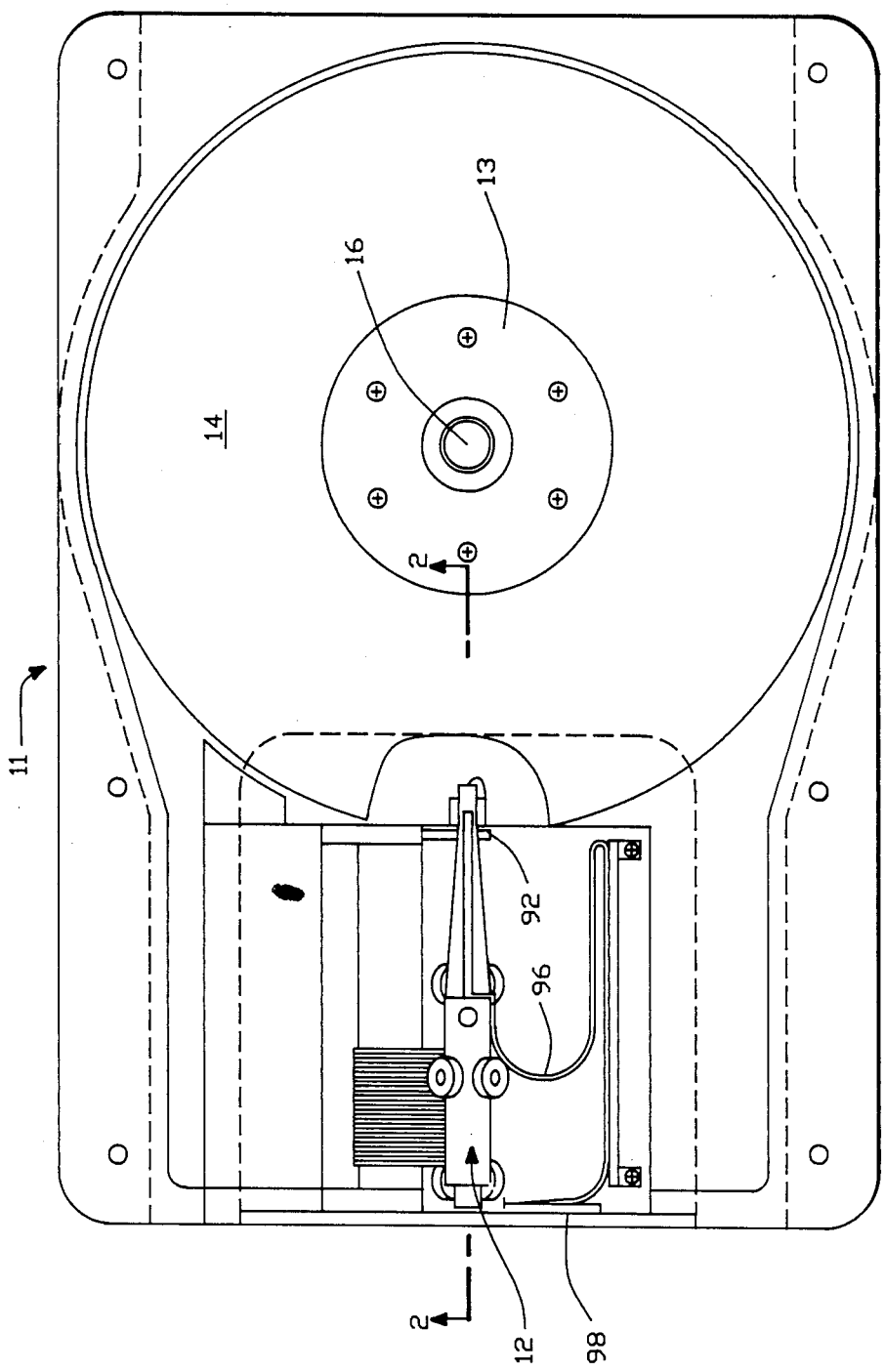
FIG. 1 is a top plan view of a disk drive incorporating a linear actuator of the type incorporating the present invention.
Figure 2:
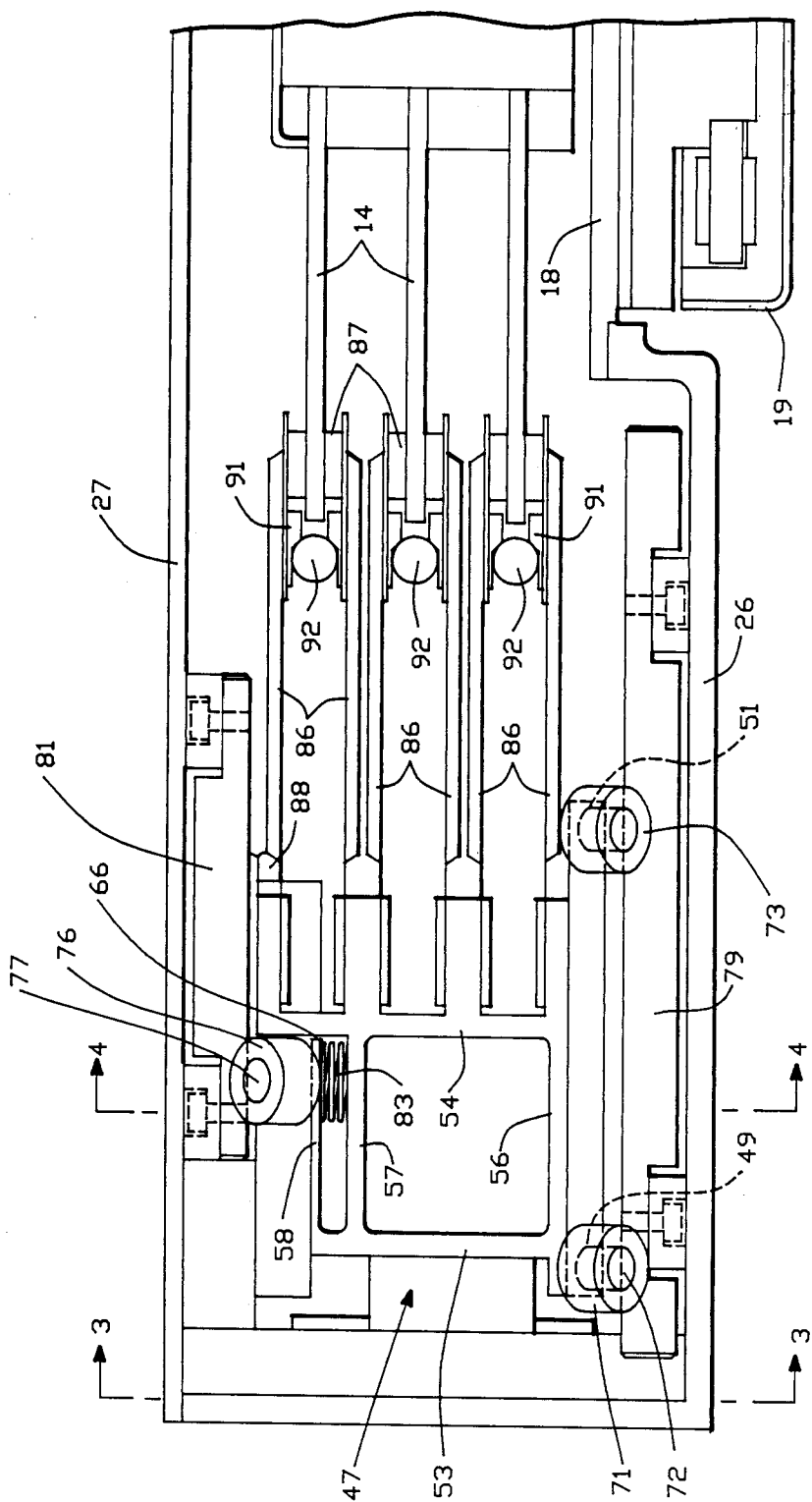
FIG. 2 is a cross-sectional view taken along the line 2—2 of the linear actuator shown in FIG. 1.

More particularly, as shown in FIG. 1, a complete disk drive 11 is provided which includes a linear actuator 12 incorporating the present invention. The disk drive 11 includes a spindle 13 which carries three separate magnetic disks 14 which are spaced apart in a vertical direction. The spindle 13 is driven by a shaft 16 rotatably mounted in bearings (not shown) carried within a central post assembly 18 (FIG. 2). The shaft is rotated by a rotary motor 19. The post assembly 18 is mounted in a base plate 26. The base plate 26 serves to enclose the linear actuator 12 and is provided with a top opening which is closed by a removable cover 27.

Figure 3:
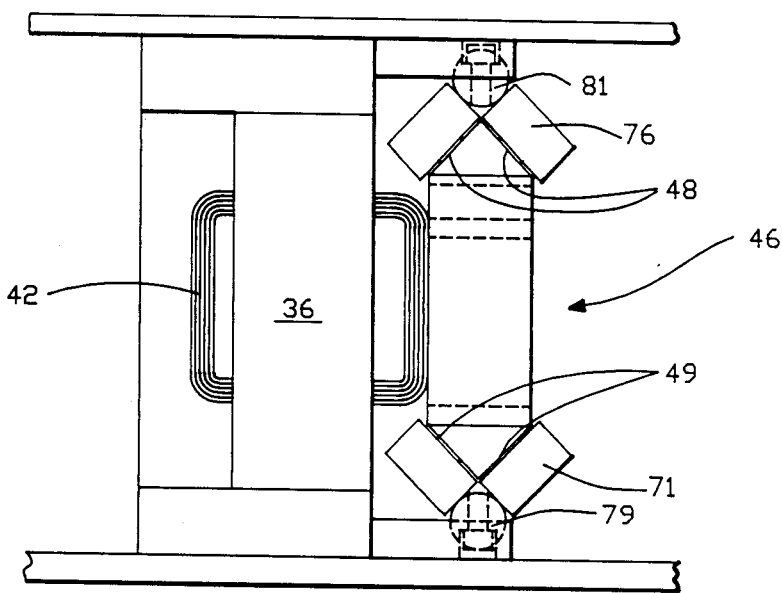
FIG. 3 is a cross-sectional view taken along the line 3—3 of FIG. 2.
Figure 4:
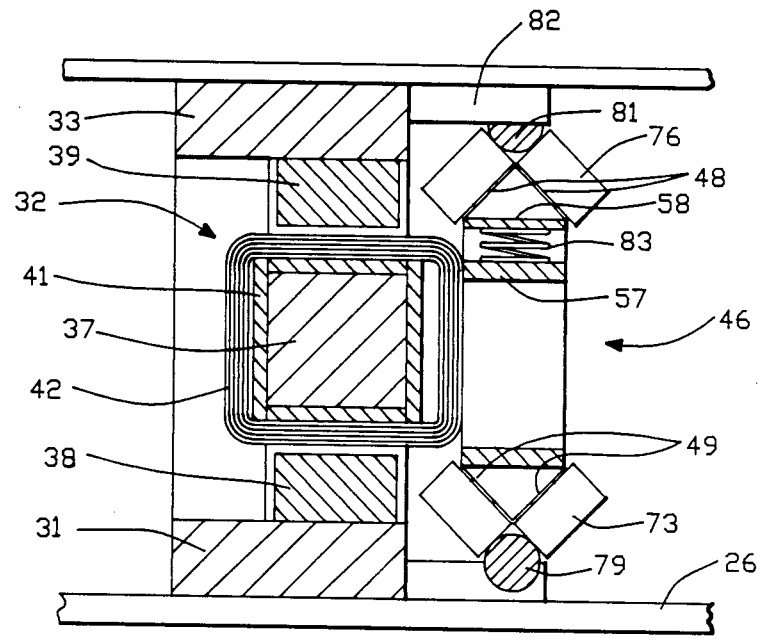
FIG. 4 is a cross-sectional view taken along the line 4—4 of FIG. 2.

The linear actuator 12 consists of a bottom or base plate 31 and a top plate 33 (FIGS. 3, 4) which comprise part of a magnet structure 32. The magnet structure 32 further includes spaced-apart parallel end plates 36. A central pole piece 37 is provided which extends between the end plates 36 and is secured thereto. As shown in FIG. 4 the central pole piece 37 is disposed intermediate between the bottom plate 31 and the top plate 33. First and second magnets 38 and 39 are mounted on the bottom plate 31 and the top plate 33 respectively. As can be seen, the magnets 38 and 39 extend in a direction parallel to the plates 31 and 33. The magnets 38 and 39 are of conventional type such as ceramic magnets. A shorted turn 41 is provided on the central pole piece 37.

A coil 42 having a rectangular configuration is disposed on the central pole piece 37 and is adapted to travel longitudinally thereof. A carriage assembly 46 is provided for supporting the coil 42 for its travel longitudinally of the pole piece 37 and consists of unitary frame 47. This unitary frame 47 is preferably formed on a single casting of a suitable lightweight material such as aluminum. This unitary frame is generally rectangular in configuration and is provided with first and second upper bearing mounting surfaces 48 which are disposed at a suitable angle with respect to each other, as, for example, 90 degrees. Similarly, there are provided two pairs of first and second lower bearing mounting surfaces 49 and 51 which are also disposed at a suitable angle with respect to each other, as, for example, 90 degrees. Preferably all of these bearing mounting surfaces are machined simultaneously while the unitary frame is a single piece. Since all of these bearing mounting surfaces are machined in a single machine operation, the mounting surfaces lying in the same plane are precisely parallel and in alignment.

The unitary frame 47 consists of spaced-apart parallel rear and front walls 53 and 54 and spaced-apart and parallel bottom and top walls 56 and 57. Another wall or member 58 extends from the back wall 53 above top wall 57. Member 58 is cantilevered and flexible whereby spring 83 positioned between member 58 and and top wall 57 urges member 58 and rollers 76 mounted thereon upwardly.

It can be seen from the foregoing that there has been provided a unitary frame 47 which by its construction is relatively rigid yet low in mass. A slot 66 is machined into the unitary frame 47 through the wall 58 immediately adjacent to the wall 54 so that the wall 58 is cantilevered from the wall 53. A pair of rollers 71 is rotatably mounted upon pins 72. The pins 72 are mounted on the bearing mounting surfaces 49 of the unitary frame 47 in a position so that the rollers 71 are disposed at the rearmost extremity of the unitary frame 47. Similarly, another pair of rollers 73 are mounted upon the foremost extremity of the unitary frame 47. A pair of rollers 76 is rotatably mounted upon the pins 77. The pins 77 are mounted on the bearing mounting surfaces 48 in such a manner so that the rollers 76 are disposed on the unitary frame 47 in a position which is generally intermediate of the lower rollers 71 and 73. The lower rollers 71 and 73 are adapted to engage a cylindrical rod 79 which is mounted on the bottom base plate 26 as shown in FIG. 4. Similarly, the rollers 76 are adapted to engage a cylindrical rod 81 that is carried by extensions 82 of top plate 33 of the magnet structure 32. It can be seen that the rods 79 and 81 are disposed to one side of the magnet structure and are spaced apart and parallel.

Means is provided for yieldably urging the rollers 76 into engagement with the rod 91 and consists of a spring 83 which is disposed between the wall 57 and cantilevered member 58 adjacent the free extremity of member 58 to apply a force which urges the rollers 76 towards the rod 81. It can be seen that by providing such a unitary frame with the wall or cantilevered arm 57, the arm 57 can flex in a vertical direction while being very still in a lateral direction. In other words, the free end of the arm 58 is movable in a vertical direction and stiff or non-movable in a horizontal direction. It can be seen that the rods 79 and 81 form the lower and upper rails for the carriage assembly 46. The mounting of the rollers 71, 73 and 76 is such that there is an even distribution of forces on all three roller sets. The three roller sets provide a three-point mounting for the unitary frame 47. Since all of the bearing mounting surfaces for the rollers 71, 73 and 76 were machined at the same time, the mounting of the rollers need not depend upon assembly tolerances. Also, because of this arrangement, the pre-load force which is provided by the spring 83 is distributed equally between all three roller sets.

The open web structure provided for the unitary frame 47 as hereafter described serves to provide a frame of maximum stiffness with minimum mass and weight. The frame 47 serves to mount the rollers 71, 73 and 76, the voice coil 42 and a plurality of head arms 86. As shown, particularly in FIG. 2, the head arms 86 carry heads 87 which are adapted to engage the upper and lower surfaces of the disks 14. The head arms 86 are mounted upon brackets 88. The brackets 88 are secured to the front wall 54 and extend outwardly therefrom. Thus it can be seen that there has been provided six sets of heads 87 adapted to engage upper and lower surfaces of the three disks 14. Plastic cam members 91 are mounted to the inner surface of arms 86, and when the heads 87 are moved to the outermost position on the disks 14 the cam members engage stationary rods 92 between cam members thereby flexing the arms 86 and lifting the head 87 from the surface of the disks 14. In this position the disk drive can be powered down without the heads damaging the surfaces of the disks.

The voice coil 42 is mounted on the vertical center of mass of the carriage assembly 46 but drives the carriage assembly 46 from only one side. The low mass of the carriage assembly 46 minimizes the unbalanced force applied to the carriage assembly 46 by the side-mounted voice coil 42. The voice coil travels in a linear motion toward the discs 14 in a line parallel to the radius of the disk drawn from the center of the spindle to the rear extremity of the linear actuator 12. The carriage assembly 46 is mounted on this radial line. The voice coil 42 is also mounted on a line parallel to this line but is offset. The force applied to the carriage assembly 46 by the voice coil is through a moment arm represented by the distance from the carriage center of mass to the center of force for the magnet structure. To help compensate for the unbalanced force, the carriage assembly 46 is made so that it is extremely light in weight. The construction of the wheel base for the carriage assembly 46 and the pre-load force provided by the spring 83 is more than sufficient to counteract the unbalanced force applied to the carriage by the offset voice coil 42.

All of the electronics for reading and recording data is provided on a flexible circuit cable 96 (FIG. 1). The cable 96 terminates on a connector 98 mounted in the back wall of the drive housing.

It is apparent from the foregoing that there has been provided a linear actuator for disk drives which is particularly desirable for small disk drives and particularly such disk drives which have a limited space available for the linear actuator. The carriage assembly is very light in weight because of the unitary frame structure utilized. Also by providing such a unitary frame structure the need for critical assembly tolerances is eliminated. The pre-loading for the rollers is provided in a manner which makes it possible to retain great rigidity of the unitary frame 47 in a lateral direction while permitting pre-loading of all of the bearings or rollers utilized in an equalizing manner.

While the invention has been described with reference to a specific embodiment, the description is illustrative of the invention and not to be construed as limiting the invention. Various modifications and applications may occur to those skilled in the art without departing from the true spirit and scope of the invention as defined by the appended claims.

What is claimed is:

1. A linear actuator, comprising first and second spaced-apart longitudinal plates, a magnetic structure mounted between the spaced-apart plates and having a pole piece extending in the longitudinal direction, a coil movably mounted on the pole piece and adapted to be moved longitudinally of the pole piece, a pair of spaced-apart parallel guide rails positioned adjacent to one side of said magnetic structure, and a carriage assembly including roller means on said one side for engaging said guide rails, said coil being exclusively secured to one side of said carriage assembly whereby said coil moves longitudinally on said pole piece as said carriage assembly moves along said guide rails.

2. An actuator as in claim 1 wherein said carriage means includes a unitary frame, said unitary frame having a plurality of roller mounting surfaces carried thereby, said plurality of rollers carried by said roller mounting surfaces and engaging said guide rails.

3. A linear actuator as in claim 3 wherein said unitary frame includes upper and lower walls and front and rear walls to provide a rectangular configuration, a cantilevered member extending from the back wall above the upper wall, said cantilevered member being separated from the front wall so that said member can flex relative to the rear wall, a pair of bearing mounting surfaces carried by said cantilevered member, first and second pairs of bearing mounting surfaces carried by the bottom wall, and yieldable means engaging said cantilevered member and serving to urge said member and the rollers carried thereby into engagement with the rail.

4. A linear actuator as in claim 3 wherein said yieldable means is in the form of a spring.

5. A linear actuator as in claim 3 and in which the first and second sets of rollers engaging the bottom rail are disposed adjacent the opposite extremities of the unitary frame and wherein the upper set of rollers is disposed on said cantilevered member in a position intermediate the first and second sets of rollers engaging the bottom rail.

6. A linear actuator as defined by claim 2 and further including a plurality of flexible head support arms mounted to said unitary frame and linearly driven by said actuator.

7. A linear actuator as defined by claim 6 wherein each of said arms includes a cam surface for engaging a stationary member when said linear actuator is moved to an extreme of travel, said engagement flexing said arms and lifting heads thereon from the surfaces of disks.

8. A linear actuator as in claim 1 wherein said coil is secured to said carriage so that the coil travels in a path which is parallel to the path of travel of the carriage assembly.

9. A disc drive comprising a housing, a plurality of disks rotatably mounted in said housing, a carriage assembly including a plurality of flexible arms each having a pick-up head mounted on one end thereof, and a linear actuator for driving said carriage assembly and moving said pick-up heads across the surface of said disks, said linear actuator including first and second spaced-apart longitudinal plates, a magnetic structure mounted between the spaced-apart plates and having a pole piece extending in the a longitudinal direction, a coil movably mounted on the pole piece and adapted to be moved longiudinally of the pole piece, a pair of spaced-apart parallel guide rails positioned adjacent to one side of said magnetic structure, said carriage assembly including roller means on said one side for engaging said guide rails, said coil being exclusively secured to one side of said carriage assembly whereby said coil moves longitudinally on said pole piece as said carriage assembly moves along said guide rails.

10. The disk drive as defined by claim 9 wherein said carriage means includes a unitary frame, said unitary frame having a plurality of roller mounting surfaces carried thereby, said plurality of rollers carried by said roller mounting surfaces and engaging said guide rails.

11. The disk drive as defined by claim 10 wherein said unitary frame includes upper and lower walls and front and rear walls to provide a rectangular configuration, a cantilevered member extending from the rear wall and separated from the front wall so that said member can flex relative to the rear wall, a pair of bearing mounting surfaces carried by said member, first and second pairs of bearing mounting surfaces carried by the bottom wall and yieldable means engaging said cantilevered member and serving to urge the top wall and the rollers carried thereby into engagement with the rail.

12. The disk drive as defined by claim 11 wherein said yieldable means is in the form of a spring.

13. The disk drive as defined by claim 11 and in which the first and second sets of rollers engaging the bottom rail are disposed adjacent the opposite extremities of the unitary frame and wherein the upper set of rollers is disposed on said cantilevered member in a position intermediate the first and second sets of rollers engaging the bottom rail.

14. The disk drive as defined by claim 10 and further including a plurality of flexible head support arms mounted to said unitary frame and linearly driven by said actuator.

15. The disk drive as defined by claim 14 wherein each of said arms includes a cam surface for engaging a stationary member when said linear actuator is moved to an extreme of travel, said engagement flexing said arms and lifting heads thereon from the surfaces of disk.

* * * * *